March 24, 1959

T. N. D'ALTRUI 2,878,758

SPECIALLY MOUNTED ATTACHMENT PIN FOR UNDER-FLOOR
TOW CONVEYOR TRUCK

Filed Sept. 3, 1957

Inventor:
Thomas N. D'Altrui

Dudley B. Howard
By.
Attorney.

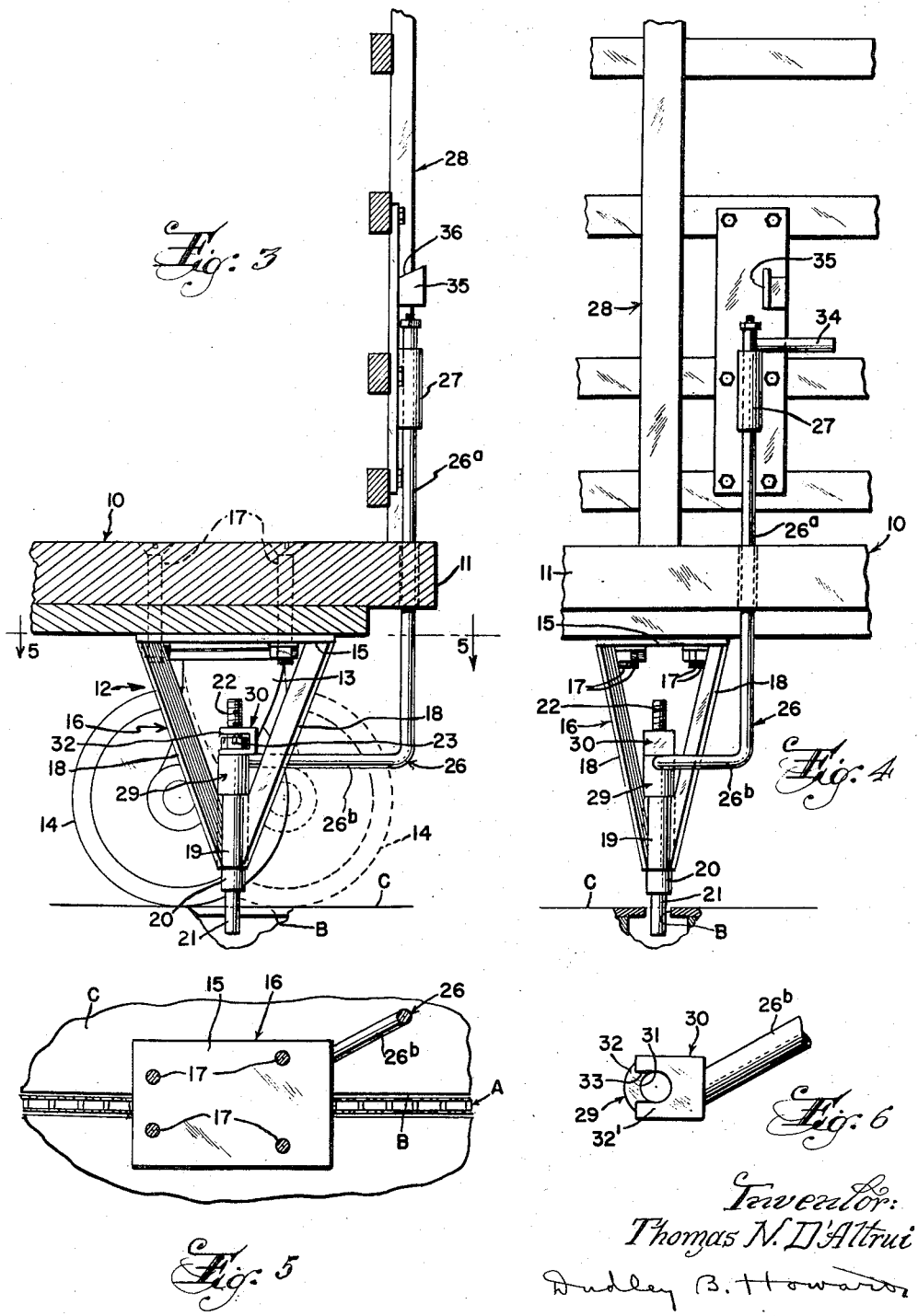

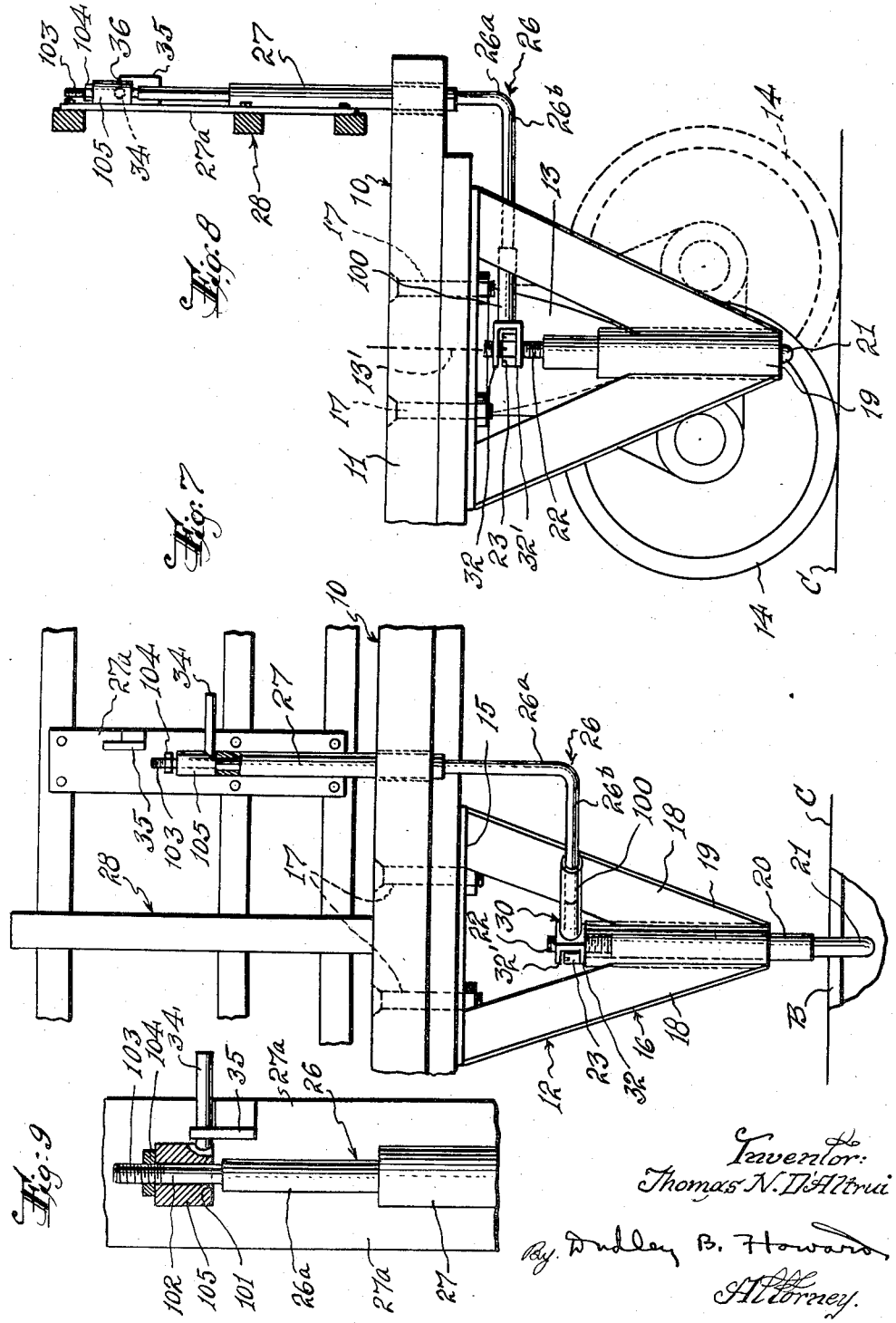

United States Patent Office  2,878,758
Patented Mar. 24, 1959

2,878,758

SPECIALLY MOUNTED ATTACHMENT PIN FOR UNDERFLOOR TOW CONVEYOR TRUCK

Thomas N. D'Altrui, Irvington, N.J.

Application September 3, 1957, Serial No. 684,389

11 Claims. (Cl. 104—172)

The invention relates in general to the power conveyor systems employed in industrial plants to tow light-duty trucks along a fixed surface trackway defined by an endless conveyor chain or cable that propels suitably spaced drive trolleys, or wheeled carriages, along an under-floor track beneath a floor slot for individual towing engagement with an attachment pin depending from each truck through the floor slot.

Prior to my present invention, it has been the practice to mount the attachment pin and its vertical manipulating means in a guide bracket located on the front end of the truck frame in an exposed position well in advance of the caster-type wheel holders that support the front end of the vehicle. The manipulating means includes a vertically slidable sleeve in which the attaching pin is freely rotatable to distribute the wear on its lower trolley-engaging end. The upper end of the attaching pin is supported on the sleeve by a collar secured in adjusted position on the said pin by a setscrew. The manipulating means is adapted to be shifted vertically in the guide bracket to lower the attaching pin into depressed operative position in the floor slot or to retract it into elevated inoperative position wherein it clears the floor during hand operation of the truck in moving it toward or away from the conveyor trackway.

The prior art mounting means for the attaching pin possesses numerous disadvantages. In the first place, the supporting collar with setscrew connection to the sliding sleeve of the manipulating means is not secure enough to prevent the attachment pin from being knocked out of adjustment by the vibration and shocks of operational use. Secondly, the necessarily slight clearance between the floor and the bottom of the guide bracket presents the danger that the operator may suffer injury by accidentally kicking the bracket or by getting his foot caught between it and the floor during hand operation of the truck. Thirdly, with serious detriment to efficient operation of trucks in connection with an under-floor conveyor system, location of the attachment pin at the extreme front end of the truck frame makes it possible for the pin to become elevated above the towing trolley and therefore disengaged therefrom whenever the truck starts down an abrupt incline in the trackway or when the front wheels roll over a trackway obstruction, such as dockboards. A towing failure of this kind is almost certain to cause a traffic jam necessitating a power shutdown. A fourth disadvantage is the directional relation of the load-shifting jerk that is imported to the front end of the truck when the trolley engages the attachment pin in its extreme front location. Bearing in mind that the truck is standing at the usual approach angle of 90 degrees to the track slot and that the trolley is moving at a steady rate of one mile per hour, it should be realized that impact of the trolley against the attachment pin will cause the truck to attain the same velocity as the towing trolley instantaneously. Therefore, because the swivel axes of the caster-type front wheel holders are located at a considerable distance in rear of the attachment pin, application of tractive force to said pin will jerk the truck forward as well as sideways in the direction of towing movement. Since each truck of typical construction has upright load-retaining standards or wall structures located only at the ends thereof and the usual loading practice is to pack the boxes, bales, etc., composing the load in such a manner that the front and rear components thereof will be in close frictional contact with the respective end standards or wall structures to prevent lateral shifting of the load, if possible, the sudden forward component of tractive force has always been a hazard. Due to the inertia of the load, when the forward jerk occurs, the boxes, bales, etc., at the front end of the truck will tend to remain stationary and thereby become jammed against those in rear. In consequence of this action, sufficient space will be created between the front part of the load and the front standards or wall structure to lose the load-stabilizing effect of frictional contact and the articles at the front of the load frequently shift dangerously sideways on the truck in the direction opposite to the movement of the towing trolley and sometimes spill onto the trackway in front of the next truck in line.

With the above-enumerated disadvantages of prior art mounting means for the attachment pin in mind, it is the primary object of the present invention to re-locate the said means underneath the truck frame in a position so related to the swivel axes of the caster-type front wheel holders that the attachment pin will not be elevated accidentally above its normal depth of floor-slot penetration regardless of the trackway unevenness which may be encountered in towing operations and thus cannot become disengaged from the towing trolley. In addition, this new location of the attachment pin solves the previously existing problem concerning violent shifting of the load at the time of impact between trolley and attachment pin in a manner to be described in detail later herein.

Another object of the invention is to increase the durability of the connection between the attachment pin and the supporting element of the manipulating means.

A still further object is to provide improved manipulating means which permits elevation and depression of the relocated attachment pin by use of a handle and securing means therefor positioned conveniently on the outside of the truck frame at the usual front location.

Other objects, advantages and features of the invention will become apparent as the following specific description is read in connection with the accompanying drawings, in which:

Fig. 3 is a fragmentary longitudinal sectional view, on a larger scale, of the front end portion of a truck equipped with the improved attachment pin mounting means and a section of the conveyor track, showing the said pin in depressed operative position and two reversely facing positions of the caster-type front wheel holder at the left side of the vehicle in solid and broken lines.

Fig. 4 is a similar front elevational view of the same.

Fig. 5 is a fragmentary plan view on line 5—5 of Fig. 3.

Fig. 6 is a fragmentary detail plan view of the free end of the horizontal arm of the manipulating member and the attachment pin supporting head affixed thereto.

Fig. 7 is a fragmentary front elevational view of a truck having a modified form of pin mounting and actuating mechanism.

Fig. 8 is a similar side elevation of the same; and

Fig. 9 is a large-scale fragmentary elevational view, partly in section, of the externally located pin adjusting means.

This application is a continuation-in-part of my copending application bearing Serial Number 445,747, filed July 26, 1954, now abandoned for improvements in specially mounted attachment pin for under-floor tow conveyor truck, which application will now be permitted to lapse without prejudice in view of its being superseded by this present application.

Figure 1:
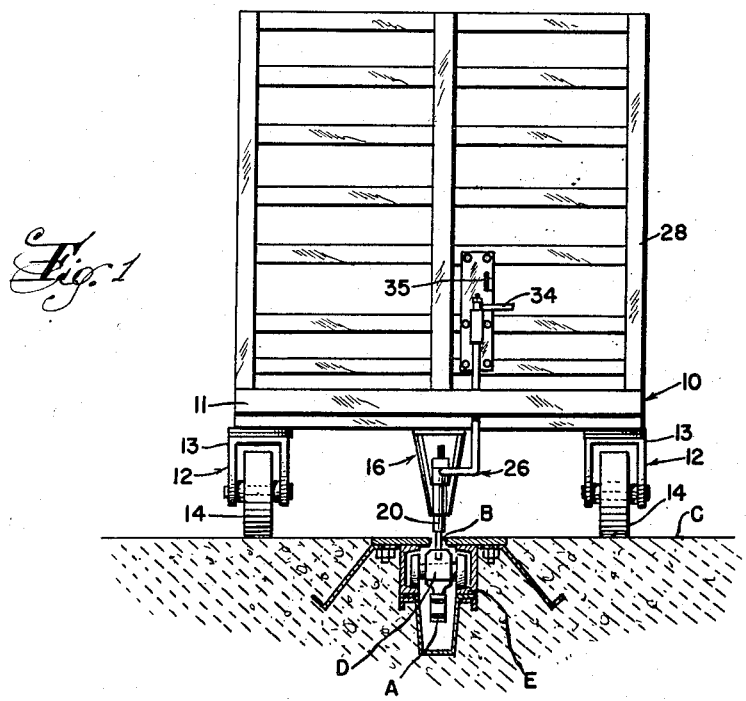
Fig. 1 is a front elevation of a truck with the improved attachment pin mount incorporated in its construction, showing the same while being towed by a conventional under-floor tow conveyor, the latter being shown in cross-section.
Figure 2:
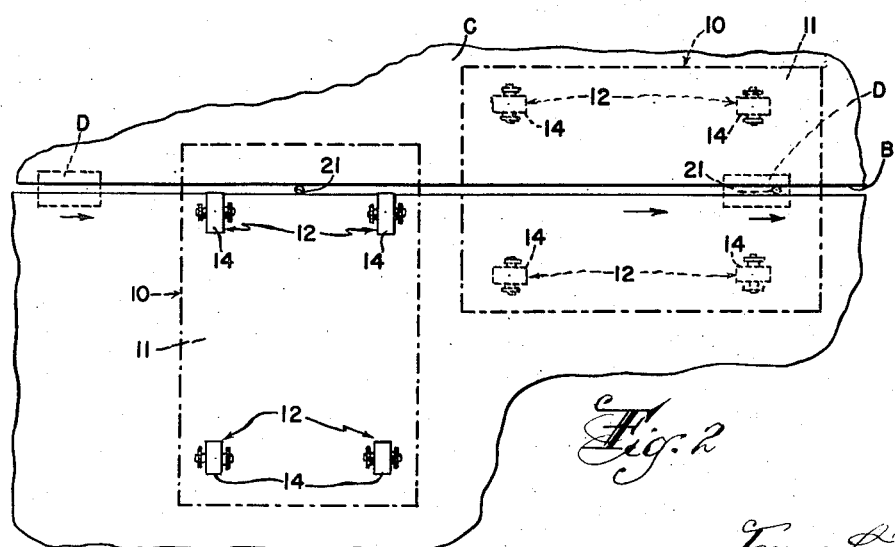
Fig. 2 is a schematic fragmentary plan view of a tow conveyor trackway, showing the successive positions of a truck before and after its attachment pin has been engaged by a drive trolley of the power conveyor system.

Referring now in detail to the drawings, wherein like reference characters designate corresponding parts in the several views, the conveyor system with which the light-duty industrial truck 10 is to be operatively associated includes endless power chain A that is moved lengthwise beneath slot B in floor C of the industrial plant by a prime mover (not shown). Attached to power chain A at convenient intervals are plural trolleys D, one of which is shown in Fig. 1. Each trolley runs on an underfloor track E and is adapted to engage the attachment pin of a truck 10 which has been lowered through floor slot B into its path of movement and thereby tow the truck along the track defined by said slot.

Truck 10 includes a rectangular frame 11 and plural running gear units 12 located suitably adjacent to its front and rear ends and including wheel holders 13 supported by floor wheels 14. To afford adequate support for all four corners of frame 11, there should be four running gear units and, to permit the truck to turn freely to right and left when being towed, the front wheel holders preferably are of caster type and are swiveled on vertical axes in their connection to frame 11.

Midway between the front caster-type wheel holders, a mounting bracket 16 of generally inverted pyramidal form has its surmounting attaching plate 15 affixed rigidly, as by bolts 17, to the bottom of truck frame 11 and depends therefrom to a point having safe clearance from the floor or other surface on which the truck is to operate. Bracket 16 preferably has plural brace bars, or rods, 18 which are affixed to attaching plate 15, as by welding, and converge downwardly therefrom into supporting union with an apically located, vertically arranged, tubular guide sleeve 19 in which attachment pin 20 is mounted for vertical shifting movement. In accordance with the present invention, guide sleeve 19 is disposed with its vertical axis preferably precisely in the same transverse vertical plane with the swivel axes of both front caster-type wheel holders 12—12.

Attachment pin 20 has its lower end portion hardened to withstand the wear and tear of engagement with the conveyor trolleys and casual contacts with obstructions in operational use. This hardened end portion of attachment pin 20 is also reduced in diameter at 21 so that any slight accidental deformation caused by particularly hard blows during exposure beneath mounting bracket 16 will not cause the pin to become jammed in bearing sleeve 19. In order that wear may be distributed uniformly around the lower end of attachment pin 20, it is freely rotatable as well as slidable in guide sleeve 19.

The upper end portion of attachment pin 20 is reduced in diameter as at 22 and is screwthreaded for adjustable engagement with a supporting and thrust-regulating nut 23 which cooperates with manual means for vertical shifting of said pin between operative and inoperative positions during operational use of truck 10 in a manner to be described presently.

The means which I prefer for vertical shifting of attachment pin 20 and for securing it in either of its shifted positions includes a substantially L-shaped rod-like manipulating member 26, which has its vertical bearing arm 26a slidably fitted in guide member 27 on plate 27a which is affixed to the outer face of front wall structure 28 of truck frame 11. The horizontal actuating portion or arm 26b of manipulating member 26 is provided at its free end with a supporting head 29 of tubular construction which is arranged with its bore vertical and in alignment with the vertical bore of guide sleeve 19 of mounting bracket 16 to similarly slidably and rotatably receive the upper end portion of attachment pin 20.

In my earlier experiments with the improved attachment pin mounting means, it was found that, by applying thrust-regulating nut 23 to the screwthreaded upper end portion 22 of pin 20 in a position to rest upon the top face of supporting head 29 of the manipulating member 26, positive upthrust was exerted upon the said attachment pin when said member 26 was lifted, but the pin sometimes became stuck in retracted position and did not follow the subsequent downward movement of the manipulating member intended to restore the pin to operative position, due to reliance on gravitational force alone. Lack of proper lubrication of guide sleeve 19 or a slight bend in pin or sleeve due to a collision or misuse were the usual causes of this objectionable pin jamming.

Therefore, means has been provided to impart positive downward restoring thrust to attachment pin 20 while avoiding interference with free rotation and a limited degree of vertical play, or lost motion, of said pin in the bores of guide sleeve 19 and supporting head 29. This downward thrust imparting means is in the form of a C-shaped channel member 30 disclosed in detail in Figs. 3, 4 and 6, which has been arranged on top of supporting head 29 of manipulating member 26 with its parallel side plates in horizontal planes. A hole 31 equal in diameter to the bore of supporting head 29 is provided in the lower plate 32 of channel member 30 for registration with said bore and said member is made integral with head 29 by welding plate 32 thereto. Upper plate 32′ of channel member 30 is provided with a slot 33 opening through the end edge thereof for reception of the reduced upper end portion 22 of attachment pin 20 when the latter is assembled with guide sleeve 19 and supporting head 29. In this assembled condition, thrust-regulating nut 23 is interposed between plates 32 and 32′ of channel member 30. Consequently, upper plate 32′ serves as means to impart positive downward thrust to nut 23 and thereby to attachment pin 20 when manipulating member 26 is lowered. Since a certain amount of lost motion must be allowed between attachment pin 20 and the manipulating means, so that, when inequalities in the level of conveyor chain A are encountered, the trolley with which the pin is engaged will not be forced downward by the weight of the loaded truck and thereby damage the conveyor, the spacing of upper and lower plates 32′ and 32 of channel member must be sufficiently greater than the axial thickness of nut 23. One reason for providing a slot in upper plate 32′ instead of the hole which is provided in lower plate 32 is that any violent upthrust of nut 23 against said upper plate, due to accidental operational forces, is likely to bend this plate upward. If only a hole were provided, it would become out of line with the hole in lower plate 32 and would cause jamming of the upper end portion of attachment pin, particularly on account of the screw threads which would become locked in the edges of a hole in the upper plate.

Abutment of supporting head 29 of manipulating member 26 against the upper end of guide sleeve 19 of mounting bracket 16 limits downward movement of said manipulating member and of attachment pin 20, the extent of projection of the lower end of said pin below the mounting bracket being determined by the adjusted and set position of nut 23 on the screwthreaded upper portion of the pin. Incidentally, it is quite necessary that nut 23 shall be a lock-nut of some kind and I prefer the castellated nut and complementary locking appurtenances of well known type shown. In its elevated position, wherein the lower end of attachment pin 20 is retracted into shielded position within the lower end portion of guide sleeve 19, manipulating member 26 is supported and secured by readily operable means illustrated in Figs. 1, 3 and 4, which will now be described.

The upper end of vertical arm 26a of manipulating member 26 is reduced in diameter to fit the preferably tubular boss of a radially projecting handle 34 which may be secured by any suitable means against axial displacement upon said arm but which is swiveled thereon. At a suitable predetermined height on front wall structure 28 of the truck frame, a supporting bracket 35 is affixed in a position laterally adjacent to vertical arm 26a wherein it will be in the path of vertical movement of handle 34 when swung around against the said wall structure in the direction of bracket 35. Consequently, when handle 34 is lifted above bracket 35 and then swung over the latter, it may be engaged with the beveled upper edge 36 of the bracket to support the manipulating member in elevated position with attachment pin 20 retracted. In order to prevent accidental dislodgment of handle 34 from supported engagement with bracket 35, the said upper edge of the latter is inclined upward and outward from the base of the bracket. By making the inclined edge straight as shown in Fig. 3, only slight manual pressure on handle 34 to swing it outward from wall structure 28 will serve to release the handle and permit lowering of manipulating member 26 to its bottom limit of motion wherein attachment pin 20 will be restored to operative conveyor-engaging position.

In further reference to the new location of attachment pin 20 wherein its axis lies in the transverse plane of the swivel axes of the caster-type front wheel holders, one of the important advantages achieved thereby may be re-stated. This advantage is the prevention of accidental disengagement of the attachment pin 20 from the towing trolley, since the front wheels of the truck now can pass over trackway obstructions without appreciable elevation of the level of the lower end of the pin. Assuming that a truck equipped with my improved attachment pin located in the vertical transverse plane of the caster swivel axes is being towed along a track slot by an under-floor trolley and the front caster wheels encounter some pieces of board or other obstructions close to the track slot but not overlying the latter. If the obstructing objects are not too thick vertically, the caster wheels will ride over the obstructions without lifting the lower end of the attachment pin high enough to become disengaged from the towing trolley. This is because the pin is so very close to the caster wheels. However, when the pin is in the old prior art location in front of the truck frame, the pin tip will rise higher because it is at the end of a lever arm (represented by the truck frame) which fulcrums on the treads of the rear truck wheels. In other words, the pin tip will be elevated through a vertical distance greater than the thickness of the track obstruction. Of course, the perfect location in this respect would be to have the attachment pin axis intersect the floor plane at a point midway between the points of tangency of both caster wheel treads with the floor when in trailing positions, but it was discovered that location of the pin axis midway between the front wheel holders and in the transverse plane of the swivel axes of the latter served additionally to minimize load upsetting tendencies previously caused by the extreme front end pin location of the prior art. The theory for this added advantage of the new attachment pin location will now be discussed.

When a truck is standing in the usual approach position at right angles to the conveyor track slot, with the attachment pin in its new location, the said pin and the axes of the front caster-type wheel holders will be directly in vertical registration with the track slot. Consequently, when the next towing trolley in the line strikes the attachment pin of the waiting truck, the latter will not move forward, i. e., in line with the major axis of its frame. Instead, the caster wheel holders will swivel instantly and the front end of the truck will move sidewise only. Therefore, there can be no rearward compacting of the load, due to inertia, such as heretofore relieved the desirable frictional contact between the foremost load components and the front end wall structure of the truck frame and permitted lateral displacement of the load in use of the earlier attachment pin location at the extreme front of the truck frame.

The operation of the attachment pin in retraction and in restoration to operative position is just as simple as in the prior art pin location and with the manipulating means associated therewith. Assuming that the attachment pin is in retracted position and that the truck is in approach position with the said pin directly overlying the floor slot of the conveyor system, all that is required to lower the pin into the floor slot in the path of the next on-coming trolley is to grasp and swing handle 34 of the manipulating means outward from the front wall structure 28 of the truck frame. The handle will ride over the inclined upper edge of supporting bracket 35 until clear of the same. Then, the handle can be lowered to its bottom limit and released in the position shown in Figs. 1, 3 and 4. When the truck arrives at the point on the trackway at which it is to be released from tow, all that is required for the operator to do is to reach in front of the truck and lift handle 34 above the level of bracket 35, whereupon the handle may be swung around until it is over said bracket and then lowered into contact with the inclined upper edge thereof, which will secure the handle against accidental dislodgment automatically.

Due to location of the attachment pin underneath the truck frame between the caster-type wheel holders, any danger of attachment pin collision with ramps or other floor inequalities or obstructions will be avoided when the truck is being operated manually, in which instance the caster-type wheel holders will usually be in trailing position. For example, when the truck is being pushed forwardly along a level stretch of a loading platform and comes to an upwardly inclined ramp leading into the door of a railway car to be entered, the attachment pin would strike the upper surface of the ramp and be damaged if in the old location outside the front end of the truck frame. On the contrary, when in the new location in the transverse plane of the caster swivel axes, the tip of the retracted pin will be located in radially circumscribed relation to the caster wheel treads and will be shielded thereby against any collision with the ramp.

Figs. 7 to 9, inclusive, represent the latest development of the invention, wherein mechanical elements corresponding to those disclosed in Figs. 1 to 6 have been designated by the same reference characters. Only the structural modifications will be pointed out with particularity hereinafter.

One important feature that remains unchanged is the location of attachment pin 20 in relation to the front caster-type wheel holders 13 and their supporting floor wheels 14. In the first place, the location of vertical guide sleeve 19 is such that the longitudinal axis of attachment pin 20 is still in the most satisfactory compromise position in the transverse vertical plane of the swivel axes 13' of the wheel holders 13. Secondly, in its retracted position (shown in Fig. 8 and determinable in Fig. 3 by measuring the vertical distance that handle 34 will move to rest upon bracket 35), attachment pin 20 has its lower end elevated high enough to be located in radially circumscribed relation to the peripheries of the two caster wheels when the latter are in axial alignment, either for forward or backward movement of the truck 10, as shown in Fig. 8.

The structural feature just mentioned affords maximum protection for attachment pin 20, because its vulnerable lower end should safely clear any floor obstruction overrun by the caster wheels, both when the truck is being towed forward by an underfloor trolley and when manually pushed backward by an attendant. This provision is very important under the severe operating conditions to which a towline truck is continually subjected.

Another protective feature is incorporated with the previously described actuating mechanism for raising and lowering attachment pin 20 in the modifications disclosed in Figs. 7 to 9.

Referring now in detail to Figs. 7 to 9, the modifications represented therein will be described, commencing with those in the immediate vicinity of attachment pin 20. It will be observed that head 29, which appears in Figs. 3 and 4, has been omitted. C-shaped channel member 30, which will be called a "head" hereinafter, is rigidly affixed in suitable manner, as by welding, to the inner end of a tubular arm 100 that projects horizontally toward the front end of truck 10 and telescopically envelopes the free end of horizontal arm 26b of L-shaped manipulating member 26 for longitudinal sliding movement thereon. The purpose of this sliding telescopic connection of arms 100 and 26b is to allow for sufficient horizontal play between attachment pin 20 and the vertical arm 26a of manipulating member 26 to prevent any binding or jamming of said pin in the event of accidental bending or distortion of pin 20 or guide sleeve 19. Under the severe conditions of towline operation, such accidental damage often occurs despite the usual rugged construction of the parts affected. In this connection, it may be explained that attachment pin 20 has considerable clearance in guide sleeve 19 to prevent binding or jamming therein under conditions of slight pin distortion, but, when these conditions are aggravated by sleeve distortion too, pin jamming could occur, due to the true rectilinear bearing for vertical arm 26a of manipulating member 26 that is provided by guide member 27, were it not for the horizontal play afforded by the telescopic connection of arms 100 and 26b.

Whereas, in the earlier embodiment of the invention illustrated in Figs. 3 and 4 in particular, head 29 rested upon the upper end of guide sleeve 19 when attachment pin 20 was in depressed operative position, head C now rests directly upon sleeve 19 under the same conditions. Consequently, attachment pin 20 still is supported in depressed operative position (Fig. 7) by guide sleeve 19 and in elevated inoperative position (Fig. 8) by handle bracket 35.

As previously described in connection with the embodiment disclosed in Figs. 1 to 6, vertical adjustment of attachment pin 20 in relation to manipulating member 26 was effected entirely by screwing thrust-regulating nut 23 up or down in its engagement with the screwthreaded portion of said pin between plates 32 and 32' of C-shaped head 30. This means of pin adjustment remains unchanged. However, due to elimination of former head 29 with its comparatively long bearing hole for attachment pin 20, there is now no danger that the pin will bind in upper plate 32' of head 30 so slot 33 therein is not needed and has been replaced by an oversize hole. Lower plate 32 also has such an oversize hole, whereby desirable lateral play between head 30 and attachment pin 20 is permitted.

At the upper end of vertical arm 26a of manipulating member 26 the diameter of said arm is reduced to provide an upwardly facing shoulder 101. The reduced upper portion 102 of arm 26a is at least partially screwthreaded as at 103 for application of an adjusting nut 104. The hub 105 of handle 34 is rotatable on reduced portion 102 of arm 26a in interposed relation to shoulder 101 and nut 104. As the result of this construction, manual lowering of manipulating member 26 will exert positive downward thrust on attachment pin 20 through the medium of head 30 and nut 23.

Due to the provision for longitudinal play between tubular arm 100 of head 30 and horizontal arm 26b of manipulating member 26, it is possible to compensate for any deviation from the vertical of guide member 27, which has very free sliding clearance between said guide member and vertical arm 26a of the manipulating member.

Some practical advantages of my improved attachment pin mounting and actuating mechanism, particularly in its recently modified form, may be enumerated as follows:

(1) Location of the manipulating handle in a clearly visible and accessible, approximately shoulder-high position outside the front end wall of the truck, where an attendant can determine at a glance the vertical position of the attachment pin, i. e. whether depressed or retracted, and can flip the pin up or down as desired while standing erect in a safe location without having to reach with hand or foot underneath one side of the truck, while possibly in motion, as in prior art construction of which I am aware, with great danger of bodily injury and faulty, unintended actuation;

(2) Positive, forcible actuation of the attachment pin, downward as well as upward, to overcome any friction due to corrosion, bending or moderate misalignment of the pin or its guide means, all likely occurrences in the usual service;

(3) Application of thrust-regulation force to the attachment pin in direct line with its longitudinal axis because of play between manipulaitng member 26 and arm 100 of head 30 and the provision of oversize holes in said head to avoid exertion of any bending moment on the pin;

(4) Provision for horizontal play between the manipulating member and the actuating head for the attachment pin to prevent pin binding or jamming in the event of accidental distortion of the pin or its guide sleeve.

It will be understood that it is intended to cover all changes and modifications of the examples of the invention herein chosen for the purpose of illustration which do not constitute departures from the spirit of the invention and scope of the appended claims.

I claim:

1. An industrial truck to be operatively associated with an under-floor power conveyor system having spaced drive trolleys movable lengthwise directly beneath a trackway-defining floor slot, said truck comprising, in combination: a truck frame having front and rear ends; running gear comprising four corner-located wheels and associated wheel holder units connected to said frame in supporting relation thereto and including a pair of laterally spaced side-by-side caster-type wheel holder units swiveled on vertical axes in their connection to the frame inwardly adjacent to the front end thereof; a vertically disposed attachment pin to penetrate the floor slot and operatively engage one of the conveyor drive trolleys when in depressed operative position; mounting means for the attachment pin supported by the truck frame and including a guide sleeve located underneath the front portion of said frame in inwardly spaced relation to the margins thereof in which said pin is vertically shiftable between said depressed operative position and elevated retracted position and is located with its vertical axis in the transverse vertical plane of the swivel axes of the caster-type wheel holders; and manipulatable means provided on the truck frame by which the attachment pin may be shifted in its guide sleeve between depressed operative position and elevated retracted position, said manipulatable means including a substantially L-shaped rod-like member arranged with its vertical arm extending upward along the outer face of the front end structure of the truck frame and its horizontal arm extending rearward beneath said frame toward the pin mounting means, means provided on said frame to slidably guide said vertical arm in precisely rectilinear movement parallel to the axis of the attachment pin, a supporting head provided on said horizontal arm in superimposed relation to the guide sleeve of the pin mounting means and adapted to rest thereupon when the attachment pin is in depressed operative position and having a C-shaped channel with upper and lower plates perforated to slidably and rotatably receive the upper end portion of said attachment pin, a thrust-regulating nut screwthreaded on said upper end portion of the attachment pin and being supported by the lower plate of the supporting head in interposed relation to both plates, whereby positive upward and downward thrust may be imparted to the attachment pin by the manipulatable shifting member, and means provided on the truck frame exteriorly thereof to secure the L-shaped manipulating member detachably in elevated pin retracting position.

2. A truck as defined in claim 1, wherein the space between the upper and lower plates of the supporting head is greater than the vertical thickness of the thrust-regulating nut to afford lost motion whereby sudden upthrust of the attachment pin to a limited degree will not be resisted by inertia of the manipulatable pin shifting means.

3. A truck as defined in claim 2, wherein the perforation in at least the upper plate of the supporting head is enlarged to prevent jamming of the attachment pin therein upon accidental upward deformation of the upper plate by excessive upward thrust of said pin.

4. A truck as defined in claim 3, in which the perforation in the upper plate of the supporting head is a slot opening through the edge thereof.

5. An industrial truck to be operatively associated with an under-floor power conveyor system having spaced drive trolleys movable lengthwise directly beneath a trackway-defining floor slot, said truck comprising, in combination: a truck frame having front and rear ends; running gear comprising four corner-located wheels and associated wheel holder units connected to said frame in supporting relation thereto and including a pair of laterally spaced side-by-side caster-type wheel holder units swiveled on vertical axes in their connection to the frame inwardly adjacent to the front end thereof; a vertically disposed attachment pin to penetrate the floor slot and operatively engage one of the conveyor drive trolleys when in depressed operative position; mounting means for the attachment pin supported by the truck frame and including a guide sleeve located underneath the front portion of said frame in inwardly spaced relation to the margins thereof and in which said pin is vertically shiftable in a position located in the transverse vertical plane of the caster swivel axes between said depressed operative position and elevated retracted position; and manipulatable means provided on the truck frame by which the attachment pin may be shifted in its guide sleeve between depressed operative and elevated retracted positions and be supported in both positions, said means including an L-shaped manipulating member having a vertical arm and a horizontal arm projecting from the lower portion of said vertical arm, guide means to mount the vertical arm of said manipulating member on the front part of the truck frame exteriorly thereof for rectilinear sliding movement, a supporting head located underneath the truck frame and having vertical sliding connection with the attachment pin, said supporting head being adapted to rest directly upon the guide sleeve when the attachment pin is in depressed operative position, and having a C-shaped channel with upper and lower plates perforated to slidably and rotatably receive the upper end portion of said attachment pin, a thrust-regulating nut screwthreaded on said upper end portion of the attachment pin and being supported by the lower plate of the supporting head in interposed relation to both plates, whereby positive upward and downward thrust may be imparted to the attachment pin by the manipulatable shifting member, interposed between the attachment pin and supporting head, means connecting the supporting head of the attachment pin to the horizontal arm of the manipulating member with horizontal play to prevent binding of said pin in the event of accidental distortion of the same or its guide sleeve, and means provided on the truck frame to support the manipulating member and its attachment pin load selectively in elevated position.

6. A truck as defined in claim 5, wherein the upper and lower plates of the C-shaped supporting head for the attachment pin have aligned oversize holes for penetration by the upper end portion of the attachment pin, wherein the upper end portion of the attachment pin is screw-threaded, and wherein the thrust-regulating nut is of less vertical thickness than the space between plates of the supporting head and is adjustably engaged with the attachment pin between said plates.

7. A truck as defined in claim 5, wherein a horizontal arm rigid with the supporting head for the attachment pin is arranged in alignment with the horizontal arm of the manipulating member, and wherein one of said horizontal arms is tubular for telescopic sliding connection with the other of said arms.

8. A truck as defined in claim 5, wherein a radially projecting handle has a hub swiveled on the upper end of the vertical arm of the manipulating member to compensate for any variation in the length of the manipulating member and adjoining members or in the dimensions of the supporting truck structure, wherein the upper end portion of the vertical arm of the manipulating member is screwthreaded and is adapted to project above the handle hub, and wherein an adjusting nut is threaded on the upper end of said vertical arm for supported contact with said hub.

9. The truck as defined in claim 8, to which is added a supporting bracket located on the truck frame exteriorly thereof adjacent to the path of movement of the handle of the manipulating member and adapted to support said handle and its attachment pin load when said handle is swung horizontally above said bracket and rested thereon in the elevated position of said member.

10. The truck as defined in claim 9, wherein the upper edge of the supporting bracket is beveled upwardly and outwardly from the truck frame to secure the handle of the manipulating member against accidental dislodgement from supported position.

11. A truck as defined in claim 5, wherein a radially projecting handle was a hub swiveled on the upper end of the vertical arm of the manipulating member, wherein the upper end portion of the vertical arm of the manipulating member is screwthreaded and is adapted to project above the handle hub, wherein an adjusting nut is threaded on the upper end of said vertical arm for supported contact with said hub, and wherein the upper end of the vertical arm of the manipulating member has an upwardly facing shoulder beneath the screwthreaded portion thereof for limiting contact with the handle hub to impart positive downward thrust to said manipulating member when the handle is operated downward.

References Cited in the file of this patent

UNITED STATES PATENTS

| | | |
|---|---|---|
| 297,068 | Corning | Apr. 15, 1884 |
| 1,000,106 | Morris | Aug. 8, 1911 |
| 1,124,272 | Bernheim | Jan. 12, 1915 |
| 2,576,178 | Hiles | Nov. 27, 1951 |
| 2,619,370 | Leger | Nov. 25, 1952 |
| 2,619,916 | Rainier | Dec. 2, 1952 |
| 2,621,609 | McCaul | Dec. 16, 1952 |
| 2,621,610 | Boyko et al. | Dec. 16, 1952 |
| 2,635,555 | Hansson | Apr. 21, 1953 |
| 2,737,902 | Folsom | Mar. 13, 1956 |
| 2,816,516 | Diehl | Dec. 17, 1957 |